US010716315B2

(12) United States Patent
Sexton et al.

(10) Patent No.: US 10,716,315 B2
(45) Date of Patent: Jul. 21, 2020

(54) COMPOSITION FOR COLOURING CHEESE CURD (71) Applicant: Cybercolors Ltd., Co. Cork (IE)

(72) Inventors: Noel Sexton, Co. Cork (IE); Frank O'Sullivan, Co. Cork (IE); John Langton, Co. Kilkenny (IE); Kieran Dwane, Co. Cork (IE); Aine Curtin, Co. Cork (IE)

(73) Assignee: Cybercolors Ltd., Co. Cork (IE)

( * ) Notice: Subject to any disclaimer, the term of this patent is extended or adjusted under 35 U.S.C. 154(b) by 0 days.

(21) Appl. No.: 15/966,493

(22) Filed: Apr. 30, 2018

(65) Prior Publication Data

US 2018/0242607 A1 Aug. 30, 2018

Related U.S. Application Data (62) Division of application No. 12/673,274, filed as application No. PCT/EP2009/066997 on Dec. 11, 2009, now abandoned.

(30) Foreign Application Priority Data

Dec. 15, 2008 (IE) .................................. S2008/0996

(51) Int. Cl.
*A23C 19/09* (2006.01)
*A23L 5/44* (2016.01)

(52) U.S. Cl.
CPC ............ *A23C 19/0925* (2013.01); *A23L 5/44* (2016.08); *A23V 2002/00* (2013.01)

(58) Field of Classification Search
CPC .............................. A23C 19/0925; A23L 5/44
USPC .................... 426/250, 256, 540, 582
See application file for complete search history.

(56) References Cited

U.S. PATENT DOCUMENTS

| | | | | |
|---|---|---|---|---|
| 3,156,568 A | * | 11/1964 | Hargrove | A23C 19/043 426/35 |
| 4,238,520 A | | 12/1980 | Miller et al. | |
| 6,007,856 A | | 12/1999 | Cox et al. | |
| 6,120,820 A | | 9/2000 | Brody et al. | |
| 6,132,790 A | * | 10/2000 | Schlipalius | B82Y 5/00 426/250 |
| 6,458,394 B1 | | 10/2002 | Talbott | |
| 2001/0046546 A1 | | 11/2001 | Ernster | |
| 2003/0031706 A1 | * | 2/2003 | Runge | A61K 31/07 424/456 |
| 2006/0177484 A1 | * | 8/2006 | May | A23C 19/054 424/439 |

FOREIGN PATENT DOCUMENTS

| | | | |
|---|---|---|---|
| CH | 245052 A | 10/1946 | |
| EP | 0050418 A1 | 4/1982 | |
| GB | 2248170 A | * 4/1992 | ........... A23C 19/054 |
| GB | 2248170 A | 4/1992 | |
| WO | 9907233 A1 | 2/1999 | |
| WO | WO-9907233 A1 | * 2/1999 | ........... A23C 19/053 |
| WO | 0108511 A1 | 2/2001 | |
| WO | WO-0108511 A1 | * 2/2001 | ........... A23D 7/0056 |

OTHER PUBLICATIONS

Luck H, Colouring Cheese by Means of Beta-Carotene:, Suid-Afrikannse Tydskrif Vir Suiweltegnologie—South African Journal of Dairy Technology, Pretoria, SA, vol. 4, No. 4, Jan. 1, 1972, pp. 207-213.
Luck H, "Problems Encountered with the Colouring of Cheese by Means of Water-Soluble Beta-Carotene Preparations", Auid-Afrikannse Tydskrif Vir Suiweltegnologie—South African Journal of Dairy Technology, Pretoria, SA, vol. 5, No. 4, Jan. 1, 1973, pp. 181-185.
NPL dl alpha tocopherol and NPL dl alpha tocopherol I (confirm date) in "Life Enhancement Magazine", 2008 , Under Q & A session.
"Paprika", Jun. 8, 2008 (retrieved from the Internet on Dec. 4, 2012), http://web.archive.org/web/20080608042216/http://www.wildflavors.com/?page=paprkia.
"Paprkia extract, chemical and technical assessment (CTA)" prepared for the 69th JECFA in Rome from Jun. 19-26, 2008, (retrieved from the Internet on Dec. 4, 2012), http://www.fao.org/fileadmin/tempates/agns/pdf/jecfa/cta/69/Paprkia_extract/pdf.

\* cited by examiner

*Primary Examiner* — Erik Kashnikow
*Assistant Examiner* — Bhaskar Mukhopadhyay
(74) *Attorney, Agent, or Firm* — The Webb Law Firm (57) ABSTRACT A composition for colouring cheese curd comprising a combination of an oil phase comprising an effective amount of paprika, an effective amount of a carotenoid, and a fat, and an aqueous phase comprising a caseinate. The composition selectively colours the cheese curd while leaving the whey fraction uncoloured.

15 Claims, 3 Drawing Sheets

Annatto   Paprika    Paprika +   Paprika +
(8.8ppm) (6.5ppm) Carotene    Annatto
                   (18.9ppm) (14.5ppm)

Figure 3

COMPOSITION FOR COLOURING CHEESE CURD

CROSS-REFERENCE TO RELATED APPLICATIONS

The present application is a divisional application of U.S. patent application Ser. No. 12/673,274, filed Mar. 3, 2010, which is the U.S. national stage application of International Patent Application No. PCT/EP2009/066997 filed Dec. 11, 2009, which claims priority to Irish Patent Application No. S2008/0996, filed Dec. 15, 2008.

FIELD OF THE INVENTION

The present invention relates to the colouring of cheese, such as a natural cheese. In particular, the present invention relates to the manufacture of coloured cheese with uncoloured whey by-product.

BACKGROUND TO THE INVENTION

The preparation of coloured cheeses originated in Somerset, Southern England in a place called Cheddar. It was here, noted during the summer months in the Middle Ages, that the natural carotene colour in the milk was carried through to the cheese curd and resulted in the preparation of the traditional coloured cheddar cheese. The visual aspect of the colour became extremely important in terms of consumer perception of the quality of cheddar cheese. Thus, today, when milk is pasteurised, the use of annatto colour is extremely important to achieve the visual appearance of coloured cheese, including cheddar, Leicester, Gloucester, etc. The orange-yellow colour derived from annatto is synonymous with cheddar cheese.

During the cheese-making process, coagulation of milk yields solid curds (later to become the cheese portion) and a watery portion, commonly referred to as fluid whey. Fluid whey generally contains 5-7% solids, mainly fats, soluble and insoluble proteins, carbohydrates and ash, the remaining portion being mainly water. Fluid whey has a very high biological oxygen demand (BOD). As such, disposal of fluid whey by application to land or watercourses is typically illegal in most civilized countries. Treatment in an effluent plant is expensive. Traditionally, fluid whey has been supplied as an animal feed, mainly to pigs. These factors have resulted in development of processing technologies to recover the valuable components of the whey fluid for preparation of high value-added food and feed ingredients for the world-wide food and feed industry, e.g. whey protein and its derivatives are now being processed to high value added proteins for the baby food, functional food, and prepared food markets. Whey cream is processed into valuable milk fat products.

However, the use of annatto to produce cheddar cheese, for example, also causes colouring of the whey by-product stream in cheese processing and this colouring of the whey stream causes major loss of value and inefficiencies in large dairy whey processing plants. There are processes for bleaching the annatto colour from the whey fraction but these processes may add extra processing steps, may alter the nature, composition and functionality of the resulting whey by-products and the uses for the bleached whey by-product may be legally restricted in the market.

For example, the various methods used for bleaching the coloured whey by-products include the use of hydrogen peroxide, benzyl peroxide, etc., which have the disadvantage in that the protein composition of the whey by-product is inherently changed. As such, the consequences of the bleaching process on the attributes of the protein composition of the whey by-product are undesirable for whey processing.

Some processes have been devised to avoid bleaching the coloured whey by-product. For example, U.S. Pat. No. 6,120,820 to Brody et al. uses a separation technology in an effort to remove the colour from the coloured whey by-product stream. This process attempts to separate the highly coloured fraction from the less coloured fraction in the whey by-product stream after pitching. By its nature, this approach adds additional processing steps and is inherently a more costly process. More importantly, the process is not 100% efficient in removing the colour from the already coloured whey by-product stream.

Another attempt to deal with the problems associated with annatto-coloured whey by-product is described in GB 2,248,170 to F. Hoffmann La-Roche AG. The solution proposed in GB 2,248,170 is the use of synthetic beta-carotene, which is produced by chemical processing technologies and identical to naturally occurring beta-carotene, in place of annatto. However, when synthetic beta-carotene is used, the colour shade of the resultant cheddar cheese is visually different from the cheese coloured with annatto. As annatto is the industry standard of colour in cheddar cheese, the yellow colour produced by synthetic beta-carotene is not desirable.

Furthermore, the colourant described in GB 2,248,170 also includes gelatin and a preservative in the formulation. As gelatin is sourced from the bones of animals such as pigs and the like, it may be considered undesirable in the manufacture of cheese, and particularly in the manufacture of cheese geared towards the vegetarian market. Furthermore, the use of a preservative may have a negative effect on starter culture growth, which is a necessary part of cheese making. Any ingredient that may have a deleterious affect on the starter culture vitality should ideally be avoided. As such, the formulation provided therein may have an adverse effect on the finished cheese product. Thus, there is a necessity to provide a colouring composition that prevents colouration of the whey by-product stream, while simultaneously providing a finished cheese product with the same colour as annatto-coloured cheeses.

SUMMARY OF THE INVENTION

In one aspect, the present invention provides a composition for colouring cheese curd comprising:

a combination of an oil phase comprising an effective amount of paprika, an effective amount of a carotenoid, and a fat, and an aqueous phase comprising a caseinate. The composition is advantageous in that it selectively colours the curd fraction of milk, while the whey fraction remains uncoloured. This improves the further processing of the whey fraction and reduces the cost and additional steps normally required by whey processing plants to produce colourless whey products.

Preferably, the paprika is selected from naturally occurring sources. The consumer market is increasingly demanding of natural cheese and dairy products containing no artificial colours or preservatives. As such, the use of naturally occurring paprika pigment meets the demands of the consumer and produces a healthier and more natural coloured cheese product. Desirably, the paprika is paprika oleoresin.

It is desirable that the paprika is in an amount of about 0.1 percent to about 15 percent weight per weight, preferably about 0.5 percent to about 5 percent weight per weight, more preferably about 1 percent to about 2.5 percent weight per weight, and even more preferably about 1.5 percent to about 2.0 percent weight per weight.

Preferably the percent weight per weight of paprika is based on colour strength of 100,000 colour units (CU). This is a typical starting colour strength chosen to achieve the desired final colour strength in the cheese.

The carotenoid may be selected from those extractable from naturally occurring sources. For example, the carotenoid may be selected from those extractable from algae.

Preferably, the effective amount of the carotenoid is about 0.1 percent to about 15 percent weight per weight, preferably about 0.5 percent to about 5 percent weight per weight, more preferably about 1.0 percent weight per weight to about 2.5 percent weight per weight, and even more preferably about 1.2 percent to about 1.8 percent weight per weight.

Preferably the percent weight per weight amount of carotenoid is based on colour strength of 20% of the standard carotenoid colour strength.

The amount of the combination of paprika and carotenoid in the composition of the present invention is about 0.001 percent weight per weight to about 0.5 percent weight per weight, preferably about 0.01 percent weight per weight to about 0.3 percent weight per weight, more preferably about 0.03 percent weight per weight to about 0.1 percent weight per weight, and even more preferably about 0.05 percent weight per weight to about 0.08 percent weight per weight.

It is desirable that the amount of the combination of paprika and carotenoid in the composition of the present invention is between about 0.05 percent weight per weight and about 0.06 percent weight per weight.

Preferably, the fat is selected from the group comprising butter fat, lard, or an oil such as sunflower seed oil, corn oil, soybean oil, olive oil, coconut oil, palm oil, groundnut oil, cottonseed oil, rapeseed oil, medium chain triglycerides, and combinations thereof. The amount of fat used in the composition of the present invention is up to about 20 percent weight per weight, preferably about 0.5 percent weight per weight to about 15 percent weight per weight, more preferably about 2 percent to about 8 percent weight per weight, and even more preferably about 6 percent to about 7 percent weight per weight.

In one embodiment, the fat is sunflower seed oil.

It is desirable that the caseinate is sodium caseinate or acid casein. Preferably, the amount of caseinate is about 1 percent to about 20 percent weight per weight, preferably about 2 percent weight per weight to about 10 percent weight per weight, more preferably about 4 percent to about 8 percent weight per weight, and even more preferably about 5 percent to about 7 percent weight per weight.

Preferably, the composition further comprises an emulsion stabiliser. An emulsion stabiliser is sometimes referred to as a "plasticiser" by those skilled in the art.

Suitably, the emulsion stabiliser may be selected from the group comprising maltodextrin, sucrose, glucose, fructose, lactose, maltose, invert sugar, and combinations thereof.

In one embodiment the composition further comprises an antioxidant.

The antioxidant may be selected from the group comprising ascorbyl palmitate, lecithin, alpha-tocopherol, mixed tocopherols, tocotrienols, butylated hydroxytoluene, butylated hydroxyanisole, tert-butylhydroquinone, propyl gallate, and combinations thereof.

It is desirable that the antioxidant is dl-alpha-tocopherol. The desired antioxidant has been shown to be a suitable antioxidant for this paprika carotenoid oil mixture.

Preferably the composition further comprises a polyol compound. A polyol compound is used instead of the commonly used chemical preservatives to protect the emulsion from microbiological proliferation. It is thought that this is achieved by the action of binding water and thus decreasing the water activity (aw) of the emulsion to between about 0.55 to about 0.95.

Preferably the polyol compound is selected from the group comprising a sorbitol, propylene glycol, maltitol, glycerine, and combinations thereof.

It is desirable that the polyol compound is glycerine in an amount of about 20 percent weight per weight to about 90 percent weight per weight, preferably about 30 percent weight per weight to about 60 percent weight per weight, more preferably about 40 percent weight per weight to about 50 percent weight per weight, and even more preferably about 45 percent weight per weight to about 49 percent weight per weight. Glycerine is the preferred polyol as it is one of the most commonly used and cost effective in the food industry.

In another aspect of the present invention, there is provided a method for preparing a composition for colouring cheese curd.

The method of the other aspect of the present invention comprises the steps of (a) mixing an effective amount of paprika, an effective amount of a carotenoid, and a fat to form an oil phase; (b) heating the oil phase to a suitable temperature; (c) mixing and heating a caseinate, in water, to suitable temperature to form an aqueous phase; (d) combining the oil phase and the aqueous phase for example by adding one to the other, and mixing the phases together to form an emulsion; and (e) cooling the emulsion to a suitable temperature to provide a composition for colouring cheese curd. The method of producing the composition to colour cheese curd involves the encapsulation of the colourant which desirably comprises a combination of naturally occurring colourants. The encapsulation of the colourant results in the selective and specific colouring of the curd fraction. This results in the whey fraction produced by the cheese manufacturing process remaining uncoloured.

Preferably the oil phase is heated at a temperature of between about 90° C. to about 150° C., preferably between about 100° C. and about 140° C., more preferably between about 105° C. and about 135° C., and even more preferably between about 110° C. and about 130° C.

Preferably the aqueous phase is heated at a temperature of between about 25° C. and about 80° C., preferably between about 30° C. and about 70° C., more preferably between about 40° C. and about 60° C., and even more preferably between about 45° C. and about 55° C.

Preferably the composition of the other aspect of the invention is initially combined by the use of high shear homogenisation to form a temporarily stable emulsion, and further homogenised under high pressure to form a permanently stable emulsion.

The homogenisation step may comprise two passes of high pressure of between about $35 \times 10^6$ Pascal to about $45 \times 10^6$ Pascal and about $5 \times 10^6$ Pascal to about $15 \times 10^6$ Pascal.

Optionally, an emulsion stabilizer may be added to the aqueous phase solution.

In one aspect of the invention, a polyol may be added to the emulsion.

Another embodiment of the present invention further comprises a colour strength standardisation test, a pasteurisation step involving heating to a temperature of between about 50° C. and about 90° C., more preferably between about 60° C. and about 85° C., or even more preferably between about 78° C. and about 82° C., followed by a step where the product is allowed to stand at room temperature.

It is preferable that water such as deionised water, distilled water, double-distilled water, and the like, is used as a base solution in the colouring composition of the invention.

Preferably, the amount of water is between about 10 percent weight per weight to about 60 percent weight per weight, more preferably between about 20 percent weight per weight to about 50 percent weight per weight, more preferably still between about 25 percent weight per weight to about 35 percent weight per weight, and even more preferably between about 30 percent weight per weight to about 33 percent weight per weight.

The term "paprika" when used herein with reference to the present invention is used to include extracted natural strains of paprika, for example those which consist of the fruit pods of *Capsicum annuum* L., which contain the major colouring principles of the spice.

"Paprika oleoresin" includes that substance when extracted from a natural source. For example it may be extracted from a plant source by percolation with a volatile solvent, such as acetone, alcohol, or ether, and evaporation of the solvent). As paprika is naturally rich in flavour, the quality to be used in the preparation is desirably treated to avoid carry over of paprika flavours to the cheese. For example it may be deodorised.

The general term "carotenoid" covers the wide variety of red and yellow compounds chemically related to carotene that include those found in plant foods. The principle colouring compounds in the compositions of the present invention are carotenoids, generally red (capsanthin, capsorubin), and yellow (beta-carotene, beta-cryptoxanthin, capsoleutin, violaxanthin, zeaxanthin, antheraxanthin, and cryptoxanthin). As a carotenoid colourant is usually a product containing more than one, and often many carotenoids, it is usual to refer to the colour-imparting agent as being carotenoids rather than using the singular "carotenoid". This is particularly true of carotenoid colourant extracted from natural sources.

The forms of carotenoid useful in the present invention include naturally occurring carotenes derived from palm, algal, and fungal sources, for example, *Elaies guineensis* JACQ., *Dunaliella salina*, and *Blakeslea trispora*. Such naturally occurring materials may be extracted on a commercial scale. The key aspect of the chosen carotenoids is that the colour shade/hue closely matches that imparted by annatto. For example a blend of colourants can be used such as yellow carotenoids blended with orange paprika carotenoids. Such blends of colourants can be used to impart an annatto-like colour to cheeses such as hard cheeses and in particular natural cheeses. Other carotenoids that are also suitable in the colouring composition include lutein from *Tagetes erecta* and green plants, apocarotenal, astaxanthin, and annatto, among others.

The term "fat" used herein with reference to the present invention include fats and also oils derived from animal and plant sources. (Oils that are liquid at room temperature are suitable). Animal fats include butter fat and lard, while oils include vegetable oils such as corn oil, soybean oil, olive oil, coconut oil, palm oil, groundnut oil, cottonseed oil, fractioned oil, and esters of glycerol including those with one, two or three fatty acids.

The term "emulsifier" is used to include any substance that allows the combining of two normally immiscible liquids. Examples of such emulsifiers are sodium caseinate and acid caseinate.

The term "antioxidant" includes a compound that protects the other components from oxidative deterioration. Examples of antioxidants for use in the present invention include alpha-tocopherol, ascorbyl palmitate, lecithin, mixed tocopherols, tocotrienols, butylated hydroxytoluene, butylated hydroxyanisole, tert-butylhydroquinone, propyl gallate, ascorbic acid, and retinoids.

The term "emulsion stabiliser" used in the present invention herein describes different ingredients that stabilise the emulsion. Examples of emulsion stabilisers include maltodextrin, sugars derived from beet or cane, glucose, fructose, lactose, maltose, and invert sugar.

The term "polyol" is used herein to describe chemical compounds containing multiple hydroxyl groups and in particular those used in place of chemical preservatives to protect the emulsion from microbiological proliferation. Examples of polyols include glycerine, sorbitol, propylene glycol, maltitol, and isomalt.

The term "colour standardisation strength test", "colour strength", and "colour units (CU)" are industry standard terms used herein to describe various aspects of the process of producing a coloured cheese. The "colour standardisation strength test" refers to a test determining the colour strength and colour units of, for example, paprika. "Colour strength" refers to a measure of the colour concentration of a pure colour pigment present in a colour product. The term "colour units" are an industry and International standard reference for outlining the colour strength of paprika colour products (see Processes/Experimental below for further details).

BRIEF DESCRIPTION OF THE DRAWINGS

Embodiments of the invention will be described, by way of example only, with reference to the accompanying drawings in which.

DETAILED DESCRIPTION OF THE DRAWINGS

Figure 1:
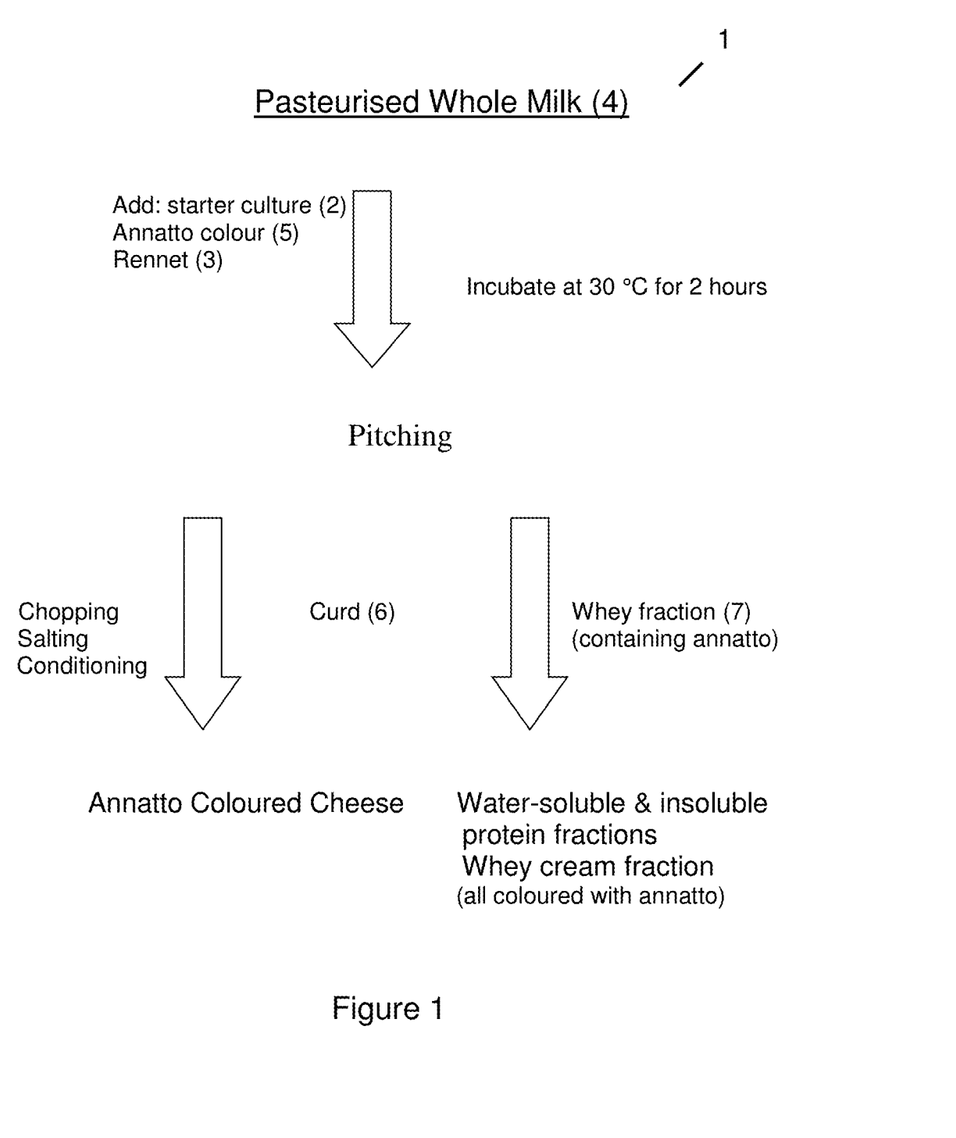
FIG. 1; is a flow diagram demonstrating the process of preparing coloured cheese using the industry standard water-soluble annatto colourant.
Figure 2:
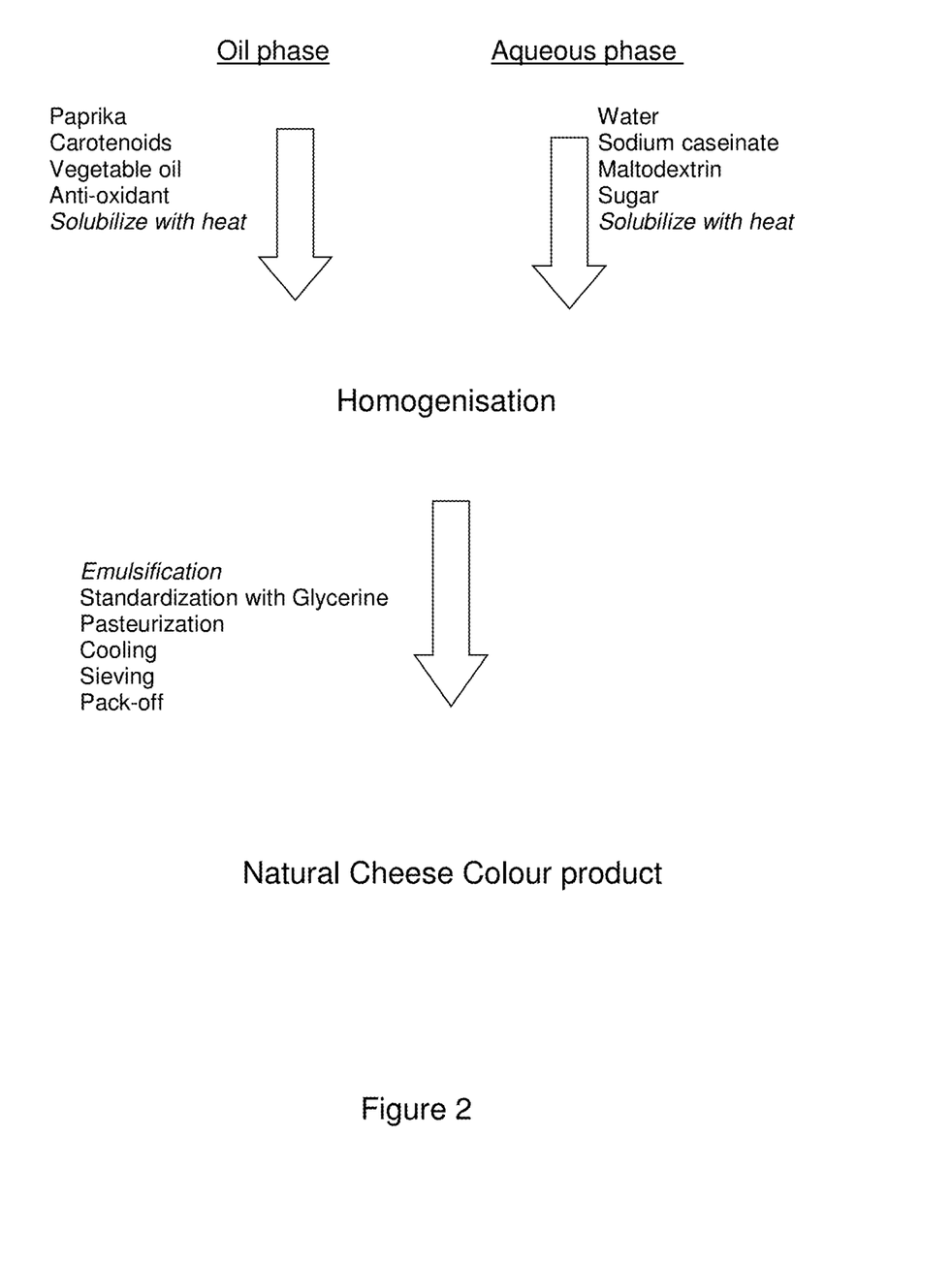
FIG. 2 is a flow diagram outlining the process for producing the paprika and carotenoids colour preparation.

The standard means of the process for the manufacture of cheese (1), and referring to FIG. 1, is the addition of a starter culture (2) and rennet (3) to pasteurised whole milk (4) together with a colourant (5), and incubated at about 30° C. for about 2 hours prior to pitching. The step of pitching separates the milk into two fractions, namely curds (6) and whey (7). The curds (6) are used to produce cheese, while the whey fraction (7) is used to produce other products, as mentioned above.

The colourant (5) used generally in the industry to colour many variants of cheese is annatto. The composition of the present invention can be used in place of the colourant (5) annatto to provide a coloured cheese.

The composition of the present invention is prepared by mixing paprika oleoresin and carotenoids in an oil-in-water emulsion by combining oil soluble ingredients (paprika oleoresin, carotenoids, and oil) with an emulsifier, in the embodiment an aqueous caseinate solution.

The ratio of paprika oleoresin to carotenoids is controlled such that the preparation will give an acceptable colour match to the colour imparted by annatto to cheddar and other natural cheeses. The paprika oleoresin and carotenoids are preferably extracted from natural sources, such as *Capsicum annuum* L. and algae (*Dunaliella salina*), respectively.

The effective amount of paprika oleoresin for use in the composition, based on a 100,000 CU stock thereof, is about 0.1 percent to about 15 percent weight per weight, preferably about 0.5 percent to about 5 percent weight per weight, more preferably about 1 percent to about 2.5 percent weight per weight, and even more preferably about 1.5 percent to about 2.0 percent weight per weight.

The effective amount of carotenoid, based on a 20% carotenoid standard colour strength, is about 0.1 percent to about 15 percent weight per weight, preferably about 0.5 percent to about 5 percent weight per weight, more preferably about 1.0 percent weight per weight to about 2.5 percent weight per weight, and even more preferably about 1.2 percent to about 1.8 percent weight per weight.

Although many fats may be used in the composition of the present invention, as outlined above, the preferred fat in the composition of the present invention is sunflower oil.

Preferred caseinates used in the composition of the present invention include sodium caseinate and acid caseinate. The caseinate forms an aqueous phase when heated to a certain temperature. When the paprika oleoresin and carotenoids are added, an emulsion is formed following homogenisation resulting in the colouring composition of the present invention. The emulsion is an oil-in-water emulsion, effectively encapsulating the paprika oleoresin and carotenoids within droplets. The paprika oleoresin and carotenoids are then selectively taken up by the curd fraction. There is no colour imparted to the whey or any remaining liquid fraction. The preferred range of caseinate used in the composition of the present invention is about 1 percent to about 20 percent weight per weight, preferably about 2 percent weight per weight to about 10 percent weight per weight, more preferably about 4 percent to about 8 percent weight per weight, and even more preferably about 5 percent to about 7 percent weight per weight.

In a preferred embodiment, an antioxidant may be used. For example antioxidant may be added to the composition of the present invention to protect the oil soluble components from oxidative deterioration. A wide selection of antioxidants may be used in the composition of the present invention, as outlined above. A preferred antioxidant is dl-alpha-tocopherol. The range of antioxidant used is between about 0.1 percent weight per weight to about 5 percent weight per weight, and preferably between about 0.2 percent weight per weight to about 2.0 percent weight per weight. And more preferably between about 0.3 percent weight per weight to about 1.0 percent weight per weight.

In a preferred embodiment, an emulsion stabiliser may be used.

An emulsion stabiliser may be added to the composition of the present invention in order to stabilise the emulsion. Preferred emulsion stabilisers used in the present invention include maltodextrin and sugar, although any of the emulsion stabilisers mentioned above may also be used. A preferred range of maltodextrin for use in the composition of the present invention is about 0.2 percent weight per weight to about 20 percent weight per weight, and more preferably about 1 percent weight per weight to about 10 percent weight per weight. A preferred range of sugar for use in the composition of the present invention is about 0.2 percent weight per weight to about 20 percent weight per weight, and more preferably about 1 percent weight per weight to about 10 percent weight per weight.

In a preferred embodiment a polyol may be used. A polyol may be added to composition of the present invention in place of synthetic chemical preservatives to protect the emulsion from microbiological proliferation, through the action of binding water and thus decreasing the water activity (aw) of the emulsion to between about 0.55 to about 0.95. Preferred polyols used in the present invention include glycerine, although any one or more of the polyols mentioned above may also be used. A preferred range of glycerine is about 20 percent weight per weight to about 90 percent weight per weight, preferably about 30 percent weight per weight to about 60 percent weight per weight, more preferably about 40 percent weight per weight to about 50 percent weight per weight, and even more preferably about 45 percent weight per weight to about 49 percent weight per weight.

A preferred embodiment of the method for preparing the composition of the present invention will now be described. Briefly, the composition is prepared by mixing together an aqueous phase and an oil phase prior to the addition of the composition to pasteurised milk.

In one embodiment, an aqueous phase is prepared by mixing an aqueous solution of sodium caseinate and emulsion stabilisers. The aqueous phase is continuously agitated and heated at a temperature of between about 25° C. and about 80° C., preferably between about 30° C. and about 70° C., more preferably between about 40° C. and about 60° C., and even more preferably between about 45° C. and about 55° C. in a processing tank by means commonly used in the colour manufacturing industry.

An oil phase is prepared comprising oil, carotenoids, paprika oleoresin, and dl-alpha-tocopherol in a further processing tank by continuous agitation. The oil phase is heated at a temperature of between about 90° C. to about 150° C., preferably between about 100° C. and about 140° C., more preferably between about 105° C. and about 135° C., and even more preferably between about 110° C. and about 130° C. to ensure complete dissolution, for example, of the carotenoids.

The oil phase is added to the aqueous phase and initially subjected to high shear homogenisation to form a crude/unstable emulsion and afterwards to high-pressure homogenisation to form a stable oil-in-water emulsion. The high-pressure homogenisation process involves two passes of the emulsion in a suitable apparatus to pressures of between about $35 \times 10^6$ Pascal to about $45 \times 10^6$ Pascal and about $5 \times 10^6$ Pascal to about $15 \times 10^6$ Pascal. Preferably, the homogenisation process involves two passes of about $40 \times 10^6$ Pa$\pm 1 \times 10^6$ Pa and about $10 \times 10^6$ Pa$\pm 1$ $10^6$ Pa.

Process/Experimental

In the trials at laboratory scale outlined below in Examples 1 to 3, the homogeniser used was a hand-held laboratory/kitchen high shear mixer. The particular model used is a Moulinex® mixer. In the scale-up trials outlined in Example 4 below, the high shear homogenisation and the high-pressure homogenisation was carried out in a two-stage homogenizer. The particular model used is manufactured by Gaulin.

The homogenised emulsion is transferred into heat-treatment/blending tank where a quantity of glycerine is added thereto. Once blended, a sample of the emulsion is analysed for colour strength using a standardised colour strength test. If necessary, a further quantity of glycerine is added as diluent to achieve the desired colour strength.

The standardised colour strength test is carried out by firstly dissolving the sample to be tested in water and then in acetone. For example, in this instance, the samples tested are carotene and paprika. An Optical Density (O.D.) measurement is read at approximately 447 nm (peak maximum) and the percent carotene is calculated. The paprika content is calculated in acetone, the O.D. is read at 462 nm ($\lambda_{max}$) and other wavelengths, as required; and colour strength and percent paprika are calculated. International Colour Units (C.U.)/g are calculated once colour strength has been determined. The formula for calculating the International Colour Units is:

$$\frac{O.D. \text{ at } \lambda_{max} \text{ at approx. } 454-462 \text{ nm} \times \text{dilution} \times 10,000}{1500 \times \text{weight (g)}}$$

The American Spice Trade Association has developed a procedure for measuring extractable colour in dehydrated sources, such as capsicums and oleoresins. The procedure is used by the industry in the United States and elsewhere. The colour strength is measured as described above and ASTA units are calculated for the sample extract using the formula:

$$ASTA \text{ colour} = \frac{\text{Absorbance of the sample} \times 16.4 \times I_f}{\text{Sample weight in grams}}$$

$I_f$ is an instrument correction factor calculated by dividing the absorbance reported by the National Institute of Standards and Technology in the USA by the absorbance recorded by the instrument being used of the standard glass filter measured at 465 nm. An ASTA value of 2,460 units is equivalent to 100,000 CU.

Once the desired colour strength is achieved, (—the present inventors use colour as measured in International Colour Units,) the emulsion is pasteurised by heating to a temperature of between about 50° C. and about 90° C., more preferably between about 60° C. and about 85° C., or even more preferably between about 78° C. and about 82° C., followed by a cooling step where the product is allowed to stand at room temperature.

The emulsion is passed through an 830 ☐m in-line stainless steel sieve into food grade poly-drums, ready for transport to a customer.

The following are a number of examples describing the preparation and use of the composition of the present invention in the manufacture of coloured cheese. All amounts are in grams (g) unless stated otherwise.

Example 1

The process for preparing the composition in Example 1 is as follows; for trial D50214 (see Table 2) the paprika oleoresin (the oil phase) was heated to 80° C., and added slowly to the aqueous phase (see Table 1 below for formulation) under high shear (using a hand-held Moulinex® blender). Following on from this, the oil phase and aqueous phase mixture was homogenised for about 3-5 minutes using a hand-held blender (Moulinex®). The same process was applied to trial D50216 (see Table 2) except that the annatto (oil phase) was heated to about 60° C. prior to addition. Both compositions emulsified/incorporated well giving a good basic emulsion.

TABLE 1

Preparation of the Aqueous Phase

| Ingredient | Weight |
|---|---|
| Deionised Water | circa. 33%' |
| Sodium caseinate (EM7)* | 6% |
| Avebe MD20** | 3% |
| Sugar | 3% |
| Glycerine | circa. 55% |

Weights in % (w/w);
*sourced from DMV International, Veghel, The Netherlands under product code EM7;
**Maltodextrin (sourced from Avebe UK Ltd. ).

TABLE 2

To create a composition which specifically binds with the curd fraction when milk is acidified, and secondly, to assess the stability in high glycerine conditions.

| Ingredient | Trial D50214 | Trial D50216 |
|---|---|---|
| Aqueous phase | 450 | 350 |
| Paprika Oleoresin (100,000 CU) | 30 | — |
| Annatto Suspension B8-SF* | — | 25 |

*oil-soluble annatto (sourced from Agro-Industrial Ltda (Brazil))

The respective compositions of Table 2 were separately added to whole pasteurised milk, following which the pH of the milk plus colourant was decreased slowly by the addition of 20% citric acid in water to about pH 4.6. The control and test samples were then filtered through Whatman No. 1 filter paper to separate the curd and whey fractions.

A positive coloured control was formed by colouring curds/whey with an annatto (norbixin) composition, which was 1.1% Norbixin (sourced from Cybercolors Ltd., Cork under product code WS11C) (that is the same cheese was formed with this colourant). An uncoloured curds/whey was used as a negative control (that is the same cheese was formed without colourant).

Results

TABLE 3

Results of first trial using paprika emulsion D50214 (dose rate 1.1 g + 154 g milk) and annatto emulsion D50216 (dose rate 1.1 g + 154 g milk) separately

| Test | Whey | Curds |
|---|---|---|
| Negative control | Pale-green yellow/translucent | Uncoloured |
| Positive control | Pale orange/yellow translucent | Coloured |
| Paprika emulsion (D50214) | Uncoloured* | Coloured** |
| Annatto Suspension B8-SF | Uncoloured* | Coloured*** |

*equivalent to uncoloured milk;
**red/orange, bright;
***dull pink.

Annatto suspension B8-SF is an oil soluble annatto colourant (sourced from Agro-Industrial Ltda (Brazil)), which was added to the oil phase and emulsified onto the caseinate. In this way, the oil-soluble annatto did not colour the whey, but this type of annatto did not give the same colour as industry standard annatto. i.e. 1.1% Norbixin (water-soluble annatto). The composition of the present invention (utilising an emulsion approach) resulted in a coloured curd and uncoloured whey fraction.

Example 2

The process for preparing the composition in Example 2 is as follows; for D80990 (see Table 5 for composition) the paprika oleoresin and tocopherol (oil phase) were heated to 85° C., and added slowly to the aqueous phase (prepared as per Table 4) under high shear (a hand-held Moulinex blender). Following on from this, the oil phase and aqueous phase mixture was homogenised for about 3-5 minutes using a hand blender (Moulinex®). The same applies to D80991 (see Table 5 for composition) except that the carotene and tocopherol (the oil phase) was heated to 148° C. Initially the compositions were very viscous, but fluid. After overnight storage, the viscosity increased.

TABLE 4

Preparation of the aqueous phase

| Ingredient | Weight |
| --- | --- |
| Deionised Water | 735 |
| Sodium caseinate (EM7)* | 165 |
| Avebe MD20** | 30 |
| Sugar | 45 |
| Glycerine | 55% (w/w) |

*sourced from DMV International, Veghel, The Netherlands under product code EM7;
**Maltodextrin (sourced from Avebe UK Ltd.)

The caseinate level was about 15 percent weight per weight.

TABLE 5

Renewed Experiments for producing uncoloured whey within coloured cheese production.

| Ingredient | Trial D80990 | Trial D80991 |
| --- | --- | --- |
| Aqueous Phase | 450 | 445 |
| Deionised Water | 50 | 45 |
| Paprika Oleoresin (100,000 CU)* | 50 | — |
| Natural Beta Carotene OS30** | — | 10.7 |
| Natural Beta Carotene OS10*** | — | 15.2 |
| Tocopherol | 2.5 | 2.5 |

*CU: a colour unit defined by the standardisation colour strength test;
**30% beta-carotene oil suspension (commercially available from Cognis);
***10% beta-carotene oil suspension (commercially available from Cognis).
Note:
no sunflower oil (or any other oil) has been directly added in these two trials.

The respective compositions of Table 5 were separately added to whole pasteurised milk, following which the pH of the milk was decreased slowly by the addition of 10% citric acid in water to about pH 4.7.

A "positive control" for colour comparison purposes was formed by colouring curds/whey with an annatto (norbixin) composition, which was 1.1% Norbixin (sourced from Cybercolors Ltd. (Cork, Ireland) under product code WS11C) (that is, the same cheese was formed with this colourant). An uncoloured curds/whey was used as a "negative control" (that is, the same cheese was formed without colourant) for colour comparison purposes.

The control and test compositions were then filtered through Whatman No. 1 filter paper to separate the curd and whey fractions.

Results

TABLE 6

Results of initial trial using paprika oleoresin (dose rate 0.2%) and carotene (dose rate 0.2%) separately

| Test | Whey | Curds |
| --- | --- | --- |
| Negative control | Uncoloured | Uncoloured |
| Positive control | Coloured | Coloured |
| Paprika oleoresin (D80990) | Uncoloured* | Coloured** |
| Carotene (D80991) | Uncoloured* | Coloured*** |

*equivalent to uncoloured milk;
**pink-orange (not acceptable for cheese);
***yellow-orange.

The results confirm the use of paprika oleoresin and carotene to colour cheese curd can also provide an uncoloured whey fraction. However, the trial indicates that the caseinate level requires optimisation to achieve a more fluid product.

Example 3

TABLE 7

Experiment to show that the caseinate emulsified paprika colour shade could be improved-i.e. decrease the pinkness of the curd and increase the yellow/orange aspect.

| Ingredient | Trial D809106 | Trial D809107 |
| --- | --- | --- |
| Deionised Water | 36% | 36% |
| Sodium caseinate (EM7) | 6% | 6% |
| Avebe MD20 | 3% | 3% |
| Sugar* | 2% | 2% |
| Glycerine** | 44% | 44% |
| Paprika Oleoresin (100,000 CU) | 1.5% | — |
| Sunflower oil | 7.5% | — |
| Biocon Annatto OS9*** | — | 8% |
| Tocopherol | 0.5% | 0.5% |

*dissolved with high shear;
**added post-homogenisation at about 63° C.;
***9% Annatto oil suspension (sourced from Biocon Del Peru, Peru)

The process for mixing the paprika oleoresin and annatto was performed as described above in Example 1 except the paprika was heated to about 83° C., while the Biocon annatto OS9 was heated to about 80° C. prior to addition to the aqueous phase. Both emulsions were good and the oil phase was well incorporated.

The respective compositions of Table 7 were separately added to whole pasteurised milk, following which the pH of the milk and milk plus colourant was decreased slowly by the addition of 10% citric acid in water to about pH 4.7. The compositions were NOT filtered as the trials were principally to assess improvement in paprika colour shade and also to assess the colour of the annatto emulsion in precipitated milk.

The colour of the compositions in precipitated milk were assessed using the CIE (International Commission on Illumination) colour space version, 1976 CIE (or CIELAB), used for defining human colour perception of an object. The CIELAB colour space is based on the concept that colours can be considered as combinations of red and yellow, red and blue, green and yellow, and green and blue. To determine the exact combination of colours of a product, coordinates of a three-dimensional colour space are assigned—L*a*b* (CIELab).

The colour shade is determined using a Hunterlab Tristimulus Colorimeter. The test sample/product is placed in a quartz cell and the colour hue/shade is measured and expressed numerically as L*a*b*. The machine is standardized in the XYZ mode; the readings can then be switched over to a L*a*b* mode whose values convert all colours within the range of human perception into a common numerical code.

L* quantifies the degree of lightness to darkness of a colour and varies from 100 for perfect whiteness to 0 for black. a* gives a + (plus) value when in the red range and − (minus) value when in the green range. b* provides a measure of yellowness when a plus value is given and gives a minus value for blueness. Thus this L*a*b* presentation of results give a numerical value to the visual appearance of the different cheese curds or whey samples produced. The closer the numerical values are to each other, the closer in colour shade each of the samples are. As an indication, colour value differences of less than 1.00, e.g. L* 78.0 compared to L* 79.0 would be very difficult to perceive with the human eye.

Results

TABLE 8

Colour assessment of the various trials plus that of industry standard Annatto (1.1% Norbixin, for example, product code WS11C, sourced from Cybercolors Ltd. (Cork, Ireland)), and a combination of paprika oleoresin (sample D809106) and annatto (sample D809107)

| Trial | Colour (Visual) | L* | A* | B* |
|---|---|---|---|---|
| D809106 (paprika) | Bright orange | 79.4 | 18.8 | 41.9 |
| D809107 (annatto) | Yellow | 80.2 | 12.7 | 63.1 |
| D80990 (paprika) | Orange-pink | 75.1 | 23.9 | 30.7 |
| D80991 (carotene) | Yellow-orange | 76.6 | 19.2 | 51.1 |
| Annatto** | Strong yellow | 78.5 | 16.7 | 55.1 |
| Paprika (D809106) + Annatto (D809107) | Paler, duller than Annatto** | 78.5 | 16.8 | 58.3 |

**the industry standard water-soluble annatto (1.1% Norbixin, for example, sourced from Cybercolors Ltd. (Cork, Ireland) under the product code name WS11C)

As can be seen from Table 8 above, the pink colour originally experienced in trial D80990 (see Table 6) has been successfully overcome in trial D809106. The paprika is more orange in shade compared with the annatto (D809107 and Industry Standard annatto WS11C), while the combination of paprika/annatto is closer in shade to the industry standard annatto used in this Example sourced from Cybercolors Ltd (Cork, Ireland) under product code WS11C.

Example 4

TABLE 9

Carrying on from Example 3, the experiments were "scaled-up" to include high-pressure homogenisation. The purpose of this trial was to get the prototype products closer to eventual production scale quality, so that optimisation trials in milk/cheese would be more pertinent. All of the emulsions below were prepared as described above in Examples 1, 2, and 3.

| Ingredient | Trial D809112 | Trial D809113 | Trial D809114 |
|---|---|---|---|
| Deionised Water | 36% | 36% | 36% |
| Sodium caseinate (Gaelac)* | 6% | 6% | 6% |
| Avebe MD20 | 3% | 3% | 3% |
| Sugar** | 2% | 2% | 2% |
| Glycerine*** | 44.9% | 44.7% | 45.3% |
| Paprika Oleoresin (100,000 CU) Deodorised | 1.7% | 0 | 0 |
| Natural Carotene OS20A**** | — | — | 5.4% |
| Biocon Annatto 059 | — | 9.5% | 0 |
| Sunflower oil | 7.8% | — | — |
| D, L alpha-Tocopherol | 0.5% | 0.5% | 0.5% |
| Medium Chain Triglyceride Oil^ | — | — | 1.0% |
| Aqueous Phase Temp. °C. | 50 | 50 | 50 |
| Oil Phase Temp. °C. | 85 | 77 | 150 |
| Pasteurisation °C. | 80/1 min | 80/1 min | 80/1 min |
| High Pressure Homogenisation (Two Pass Gaulin Homogeniser) | 7 x 10$^6$ Pa and 40 x 10$^6$ Pa | 7 x 10$^6$ Pa and 40 x 10$^6$ Pa | 7 x 10$^6$ Pa and 40 x 10$^6$ Pa |
| Colour Strength (E1 % peak max · a) | 2.70 | 1.36 | 23.30 |

*Dairygold Food Ingredients (Ireland);
**dissolved with high shear;
***added post-homogenisation at about 63° C.;
****20% carotene oil suspension;
^: sourced from coconut oil and/or palm oil.

All of the emulsions prepared above in Table 9 had a consistency that flowed very well and were very suitable for high-pressure homogenisation. Addition of glycerine did not have any great effect on viscosity of the emulsions. As such, the above trial samples were dosed into milk. A solution of 2N hydrochloric acid was slowly added to the milk to precipitate the curd fraction. There was no separation observed and all of the trial samples listed below in Table 10 were read directly on a Hunterlab D 25 Tristimulus colorimeter. The results are given below in Table 10.

TABLE 10

| Trial | Dose rate | PPM colour | L* | a* | b* |
|---|---|---|---|---|---|
| Trial D809112 Paprika (0.13% paprika carotenoids) | 0.50% | 6.5 ppm | 84.8 | 11.8 | 31.6 |
| Trial D809113 Annatto (0.052% bixin − oil soluble) + Trial D809112 Paprika (0.13% paprika carotenoids)* | 1.45% + 0.55% | 7.4 + 7.1 (Total 14.5 ppm) | 83.8 | 11.4 | 44.7 |
| Trial D809114 Carotene (0.90% carotene) + Trial D809112 Paprika (0.13% paprika carotenoids )** | 0.15% + 0.39% | 13.5 + 5.1 (Total 18.9 ppm) | 81.9 | 12.3 | 45.2 |
| Annatto (WS11C (1.10% norbixin))*** | 0.080% | 8.8 ppm | 84.8 | 9.94 | 43.3 |
| *25% milk added to dilute—indicative only | See ← | (Total 17.3 ppm) | 83.6 | 10.6 | 39.7 |
| **9% milk added to dilute—indicative only | See ← | (Total 11.6 ppm) | 83.8 | 10.6 | 41.8 |

***industry standard water-soluble annatto (1.1% Norbixin; sourced from Cybercolors Ltd. (Cork, Ireland))

Figure 3:
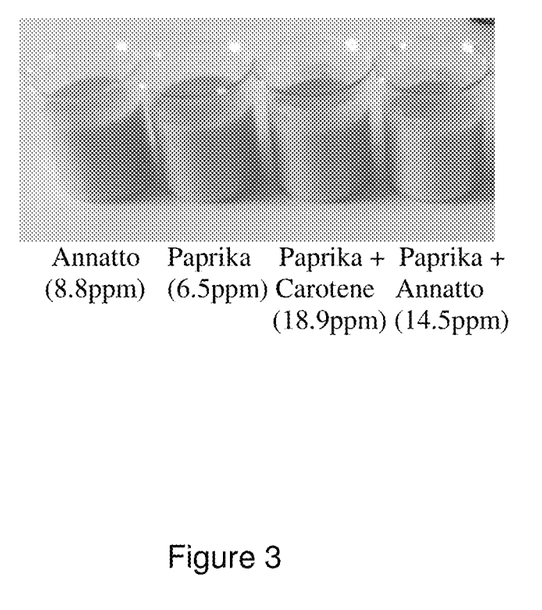
FIG. 3, is a comparison of the colouring of milk using the industry standard water-soluble annatto (1.1% Norbixin, sourced from, for example, Cybercolors Ltd (Cork, Ireland) under product code WSC11), paprika, a combination of paprika and natural carotene, and a combination of paprika and oil-soluble annatto (sourced from Biocon del Peru (Peru) under the product code Biocon Annatto OS9).

Overall, the combination of the paprika and natural carotene trial (Trial D809114 plus Trial D809112) at 18.9 ppm gave the best match to the shade produced by the industry standard water-soluble annatto in comparison to the shade produced by the combination of the oil-soluble annatto and paprika, as can be seen in FIG. 3. The colour of the annatto only coloured end product and that of the paprika/carotene combination composition were not discernible by eye. On the other hand, the colouring attained by the use of paprika alone and in combination with oil-soluble annatto was readily discernible, being darker and lighter in shade/hue, respectively, than the annatto coloured end product.

The outcome from this trial was that the improvement observed in the paprika colour shade in Example 3 was repeatable under production scale conditions, proving the potential for successful colouring of cheese.

Example 5

The trials were to check the repeatability of the paprika trials, and make what is considered to be the optimum blend of paprika and natural carotene that would give a colour shade match for annatto in cheese. The first set of trials detailed below in Table 11 was to check the optimal levels for the paprika and the natural carotenoids. The compositions were then dosed into milk as detailed below. 2N hydrochloric acid added slowly to the milk to precipitate the curd fraction. As the curd did not separate, all milk suspensions were read directly on the Hunterlab D 25 Tristimulus colorimeter. The results are given below in Table 11.

TABLE 11

Colour dose rate and colour shade results from the various trials to determine the optimum blend of paprika and natural carotene.

| Trial details | Colour dose rate | L* | a* | b* |
|---|---|---|---|---|
| Annatto (1)** | 8.77 ppm norbixin | 83.4 | 11.2 | 48.2 |
| Paprika (2) | 3.9 ppm paprika* | 82.9 | 11.1 | 51.6 |
| N Carotene*** | 13.3 ppm natural carotenoids | | | |
| Paprika (3) | 2.6 ppm paprika | 82.9 | 11.1 | 51.6 |
| N Carotene | 8.9 ppm natural carotenoids | | | |
| Paprika (4) | 4.2 ppm paprika | 84.5 | 8.6 | 46.7 |
| N Carotene | 11.5 ppm natural carotenoids | | | |
| Paprika (5) | 4.2 ppm paprika | 83.3 | 10.7 | 49.8 |
| N Carotene | 11.5 ppm natural carotenoids | | | |
| Paprika (6) | 4.3 ppm paprika | 83.4 | 10.8 | 48.5 |
| N Carotene | 9.7 ppm natural carotenoids | | | |

*Paprika carotenoids are calculated according to EC Directive 95/45/EC;
**Industry Standard water-soluble annatto (1.1% Norbixin; sourced from Cybercolors Ltd (Cork, Ireland), product code WS11C);
***natural carotene Visually, all the combinations (trials 2 to 6) were very close to the shade of the industry standard annatto used in trial 1 above. However, trial 6 is the best match with a total pigment reading of 14 ppm carotenoids. The ratio of paprika carotenoids to natural carotenoids is 1:2.25. This combination will form the basis of the combined paprika/natural carotene colourant used in the application trial in the production of a coloured cheese. This trial is outlined below in Tables 12 and 13.

The process for mixing the oil phase involved heating the natural carotenoids oil phase to about 127° C., and heating the paprika to about 80° C. prior to addition to the aqueous phase. The high-pressure homogenisation applied to both trials was 40×10⁶ and 7×10⁶ Pascal. Both trial emulsions were good and the oil phase was well incorporated. The emulsions were pasteurised at about 80° C. for 1 minute after addition of the glycerine.

TABLE 12

| Ingredient | Trial D810132 Paprika—natural carotenoids emulsion | Trial D810133 Paprika Emulsion |
|---|---|---|
| Deionised Water | 35% | 35.7% |
| Sodium caseinate (Gaelac)* | 5.93% | 6% |
| Avebe MD20 | 2.8% | 3% |
| Sugar** | 1.9% | 2% |
| Glycerine*** | 44% | 45% |
| Paprika Oleoresin (100,000 CU) Deodorised | 1.75% | 1.70% |
| Natural Carotene OS30**** | 0.92% | 0 |
| Sunflower oil | 7.2% | 7.8% |
| D, L alpha-Tocopherol | 0.5% | 0.5% |

*Dairygold Food Ingredients (Ireland);
**dissolved with high shear;
***added post homogenisation at about 63° C.;
****20% carotene oil suspension.

The D810132 composition of Table 12 was added to whole pasteurised milk as detailed in Table 13 below, following which the pH of the milk plus colourant was decreased slowly by the addition of 2N Hydrochloric acid to about pH 4.7. The curds were separated on a 106 micron sieve.

TABLE 13

| Trial | Dose rate | PPM colour | Observations: curd | Observations: whey |
|---|---|---|---|---|
| Trial D810132 Paprika-Natural Carotenoids Blend | 0.0525% | 0.60 (pap) + 1.34 (car) (Total 1.94) | Very similar visual shade to annatto. | Uncoloured |
| Annatto (1.10% norbixin)* | 0.012% | 1.308 | Pale orange coloured curd. | Light colouration- |

*industry standard water-soluble annatto (sourced from Cybercolors Ltd. (Cork, Ireland) under product code WS11C)

The trial was successful; the combination of paprika and carotene into an emulsion was acceptable. The colour shade in the curd of Trial D810132 was very close to that of the industry standard annatto.

The L*, a* and b* were read for the 3 whey fractions resulting from this trial, which included a negative control which did not have any colourant added. The results are outlined below in Table 14.

TABLE 14

| Trial | Dose rate | PPM colour | L* | a* | b* |
|---|---|---|---|---|---|
| Trial D810132 Paprika-Natural Carotenoids Emulsion Blend | 0.0525% | 0.60 (pap) + 1.34 (car) (Total 1.94) | 68 | −0.3 | 18 |
| Annatto (1.10% norbixin) | 0.012% | 1.308 | 67 | 1.4 | 27 |
| No added colour | Not applicable | 0 | 68 | −0.4 | 18 |

*industry standard water-soluble annatto (sourced from Cybercolors Ltd. (Cork, Ireland) under product code WS11C)

The L*, a* and b* results indicate that there is a very close similarity between the "No added colour" trial (the negative control) and the trial where the paprika-natural carotenoids emulsion blend was added (indicating that no colour has passed through into the whey). The trial where the 1.1% Norbixin Annatto (Cybercolors Ltd. (Cork, Ireland) Product code WS11C) was added has quite a substantial difference between the D810132 and "No added colour" trials. Overall, the L*, a*, b* values indicate that there is a yellow-orange colour present in the whey in the Annatto trial, as the a* value is 2 units higher (therefore more 'red') and the b* value is in the order of 9 units. This corroborates the visual assessment that the whey was uncoloured using the paprika-natural carotenoid blend.

CONCLUSION

The advantages of the composition of the present invention over those previously provided by the prior art is that a cost effective carotenoid colourant for cheese manufacturing has been provided herein which preferentially mixes with the curd fraction during the cheese making process. The colour achieved by the composition of the present invention matches that of the industry standard annatto colour. Importantly, the whey protein and whey cream fractions are not coloured by the composition of the present invention, thereby increasing the commercial value of the whey protein and whey cream fractions. Furthermore, as the whey protein and whey cream fractions are not coloured by the composition of the present invention, this allows for increased production of coloured cheese while not having the concurrent problem of increased quantities of coloured whey fractions. This also means an increase in the efficiency of whey processing plants where coloured whey would have been processed, due to the non-requirement to separate uncoloured whey from coloured whey fraction production. It also obviates the need for expensive additional processing steps to remove the coloured whey fractions and the undesirable bleaching process of coloured whey fractions before utilising the same production facilities for non-coloured materials.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method of selectively coloring cheese curd comprising the steps of:
   (i) adding to milk a starter culture, a rennet, and a coloring composition comprising:
      a combination of:
         an oil phase comprising about 0.5 to about 5 percent weight per weight of paprika, about 0.5 to about 5 percent weight per weight of a carotenoid, and about 2 to about 8 percent weight per weight of a fat, and
         an aqueous phase comprising about 2 to about 10 percent weight per weight of a caseinate,
         wherein the coloring composition is free of gelatin,
      thereby forming a mixture,
      wherein the coloring composition selectively colors only a curd fraction of milk, and does not color a whey fraction of milk;
   (ii) incubating the mixture so as to generate a colored curd fraction and an uncolored whey fraction; and
   (iii) separating the colored curd fraction from the uncolored whey fraction.

2. The method of claim 1, wherein the paprika is paprika oleoresin.

3. The method of claim 1, wherein the caseinate is sodium caseinate or acid casein.

4. The method of claim 1, wherein the fat is selected from the group consisting of butter fat, lard, or an oil such as sunflower seed oil, corn oil, soybean oil, olive oil, coconut oil, palm oil, groundnut oil, cottonseed oil, rapeseed oil, medium chain triglycerides, and combinations thereof.

5. The method of claim 4, wherein the fat is sunflower seed oil.

6. The method of claim 1, wherein the coloring composition further comprises an emulsion stabilizer.

7. The method of claim 6, wherein the emulsion stabilizer is selected from the group consisting of maltodextrin, sucrose, glucose, fructose, lactose, maltose, invert sugar, and combinations thereof.

8. The method of claim 1, wherein the coloring composition further comprises an antioxidant.

9. The method of claim 8, wherein the antioxidant is selected from the group consisting of ascorbyl palmitate, lecithin, alpha-tocopherol, mixed tocopherols, tocotrienols, butylated hydroxytoluene, butylated hydroxyanisole, tert-butylhydroquinone, propyl gallate, and combinations thereof.

10. The method of claim 9, wherein the antioxidant is dl-alpha-tocopherol.

11. The method of claim 1, wherein the coloring composition further comprises a polyol compound.

12. The method of claim 11, wherein the polyol compound is selected from the group consisting of a sorbitol, propylene glycol, maltitol, glycerine, and combinations thereof.

13. The method of claim 12, wherein the polyol compound is glycerine.

14. The method of claim 13, wherein the glycerine is present in an amount of about 20 percent weight per weight to about 90 percent weight per weight.

15. A method of selectively coloring cheese curd comprising the steps of:
   (i) adding to milk a starter culture, a rennet, and a coloring composition comprising:
      a combination of:
         an oil phase comprising about 0.5 to about 5 percent weight per weight of paprika, about 0.5 to about 5 percent weight per weight of a carotenoid, and about 2 to about 6 percent weight per weight of a fat, and
         an aqueous phase comprising about 2 to about 10 percent weight per weight of a caseinate,
         wherein the coloring composition is free of gelatin,
      thereby forming a mixture,
      wherein the coloring composition selectively colors only a curd fraction of milk, and does not color a whey fraction of milk;
   (ii) incubating the mixture so as to generate a colored curd fraction and an uncolored whey fraction; and
   (iii) separating the colored curd fraction from the uncolored whey fraction.

* * * * *